(12) United States Patent
Baumeister et al.

(10) Patent No.: US 10,377,332 B2
(45) Date of Patent: Aug. 13, 2019

(54) SAFETY-RELEVANT SYSTEM IN A VEHICLE

(71) Applicants: Bayerische Motoren Werke Aktiengesellschaft, Munich (DE); Magna Closures S.p.A., Guasticce-Collesalvetti (IT)

(72) Inventors: Thomas Baumeister, Munich (DE); Davide Dente, Cascina (IT)

(73) Assignees: BAYERISCHE MOTOREN WERKE AKTIENGESELLSCHAFT, Munich (DE); MAGNA CLOSURES, S.P.A., Guasticce-Collesalvetti (IT)

( * ) Notice: Subject to any disclaimer, the term of this patent is extended or adjusted under 35 U.S.C. 154(b) by 326 days.

(21) Appl. No.: 14/913,338

(22) PCT Filed: Aug. 19, 2014

(86) PCT No.: PCT/EP2014/067679
§ 371 (c)(1),
(2) Date: Feb. 19, 2016

(87) PCT Pub. No.: WO2015/024943
PCT Pub. Date: Feb. 26, 2015

(65) Prior Publication Data
US 2016/0207485 A1    Jul. 21, 2016

(30) Foreign Application Priority Data

Aug. 19, 2013   (DE) .................. 10 2013 108 932

(51) Int. Cl.
*B60R 16/03*     (2006.01)
*B60R 21/017*    (2006.01)
(Continued)

(52) U.S. Cl.
CPC ............ *B60R 21/017* (2013.01); *B60R 16/03* (2013.01); *E05B 81/80* (2013.01); *H02J 9/06* (2013.01)

(58) Field of Classification Search
None
See application file for complete search history.

(56) References Cited

U.S. PATENT DOCUMENTS 5,272,380 A * 12/1993 Clokie .................... H02J 9/002
                                                        307/10.7
6,140,911 A     10/2000   Fisher et al.
(Continued)

FOREIGN PATENT DOCUMENTS

DE       4125860 C1    8/1992
DE      10142408 A1    4/2003
(Continued)

*Primary Examiner* — Cassandra F Cox
(74) *Attorney, Agent, or Firm* — Morgan, Lewis & Bockius LLP

(57) ABSTRACT

A safety-relevant system (S) in a vehicle comprises an electrical unit (EE) with at least one signal line input (SE). The signal line input (SE) is connected to a signal line. The electrical unit (EE) additionally comprises a supply connection (VA) for feeding the electrical unit (EE) with electrical energy. For supplying electrical energy to the electrical unit (EE), the signal line is in addition electrically coupled to the supply connection (VA) of the electrical unit (EE).

20 Claims, 1 Drawing Sheet

(51) Int. Cl.
*E05B 81/80* (2014.01)
*H02J 9/06* (2006.01)

(56) References Cited

U.S. PATENT DOCUMENTS

| | | | | |
|---|---|---|---|---|
| 6,646,851 | B1* | 11/2003 | Gudat | H02P 25/08 |
| | | | | 361/115 |
| 2008/0246452 | A1* | 10/2008 | Sievers | B60R 21/017 |
| | | | | 323/282 |
| 2009/0015976 | A1 | 1/2009 | Hara et al. | |
| 2010/0079003 | A1* | 4/2010 | Bethel | H02J 9/06 |
| | | | | 307/66 |
| 2013/0041555 | A1 | 2/2013 | Kouzuma | |

FOREIGN PATENT DOCUMENTS

| | | |
|---|---|---|
| DE | 202011103664 U1 | 12/2011 |
| JP | 2002144985 A | 5/2002 |

\* cited by examiner

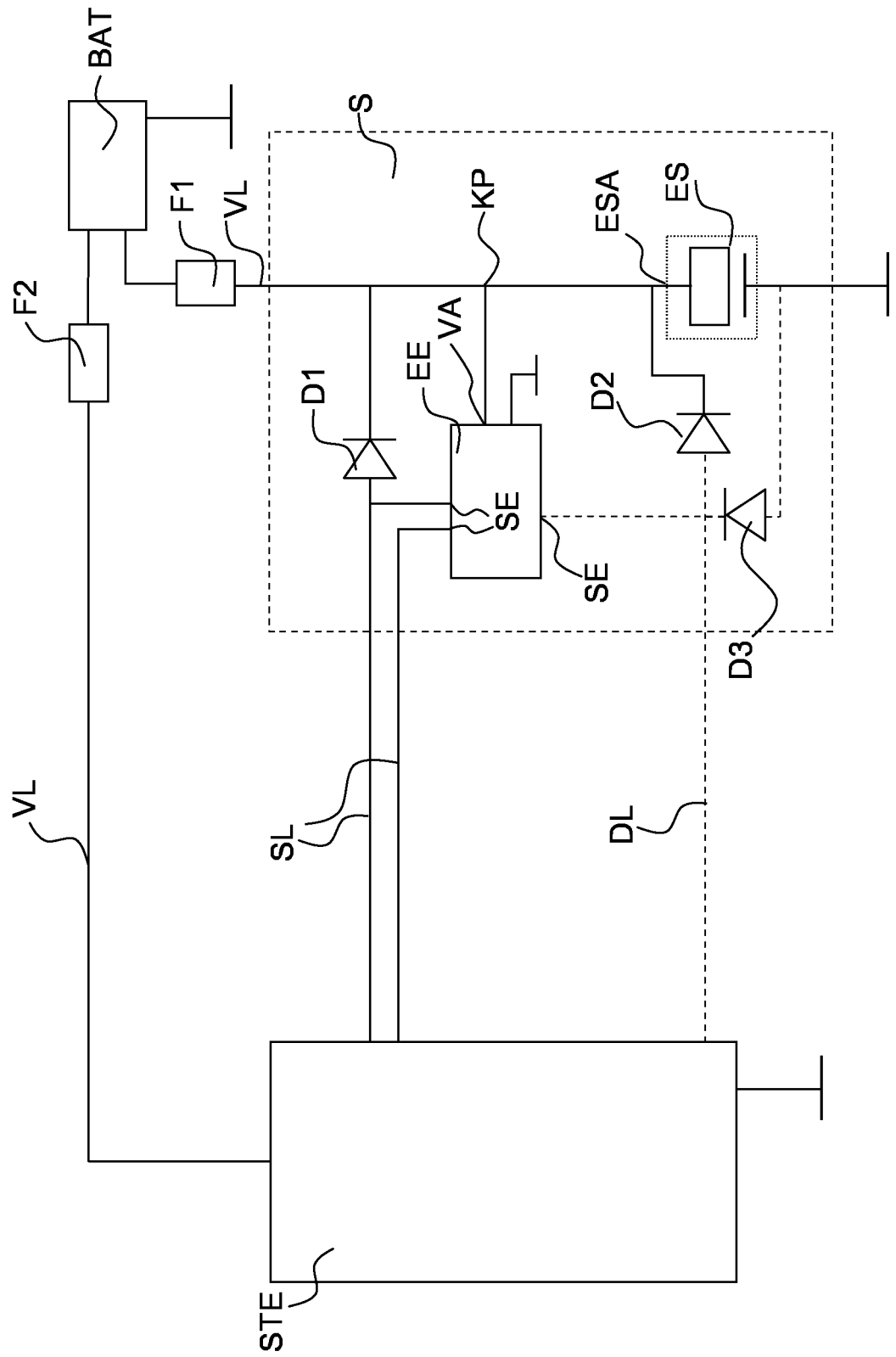

SAFETY-RELEVANT SYSTEM IN A VEHICLE

The invention relates to a safety-relevant system in a vehicle.

Any systems in a vehicle which need an electrical energy supply typically have a straightforward supply line leading from a fuse distribution board to the system. In many cases, an exclusive supply line and an exclusive electrical fuse is used for the safety-relevant system. In case of a malfunction of that supply line or of a ground connection, it may happen that the safety-relevant system can not be fed with electrical energy any more.

The objective underlying the invention is to provide a safety-relevant system with a reliable electrical emergency power supply.

The objective is achieved by the independent claim. Advantageous configurations are characterized in the subclaims.

According to a first aspect, the invention is distinguished by a safety-relevant system in a vehicle. The system includes an electrical unit comprising at least one signal line input which is connected to a signal line. The electrical unit further comprises a supply connection for feeding the electrical unit with electrical energy. In addition, the signal line is coupled to the supply connection of the electrical unit for feeding electrical energy to the electrical unit.

Coupling the signal line to the electrical unit allows to feed the electrical unit with electrical energy via the signal line. In this way, the electrical unit may be fed with electrical energy even if a main supply energy storage device such as e.g. a vehicle battery and/or a connection to the main supply energy storage device breaks down. Thus, a very reliable use of the electrical unit of the safety-relevant systems is made possible.

Further, coupling the signal line to the electrical unit realizes an emergency supply system so that a second positive and/or negative main supply connection may be dispensed with, for instance.

As an alternative or in addition, it is also possible that two or more signal lines are coupled to the electrical unit for feeding electrical energy to the electrical unit.

According to an advantageous configuration, the system further comprises an emergency supply energy storage device including an energy storage connection which is electrically connected to the supply connection of the electrical unit or to a further supply connection of the electrical unit for the purpose of feeding electrical energy to the electrical unit. In addition, the emergency supply energy storage device is electrically coupled to the signal line, for feeding electrical energy to the emergency supply energy storage device.

The emergency supply energy storage device comprises an electrical energy storage means, for instance. For example, the signal line is electrically coupled to the electrical energy storage means of the emergency supply energy storage device, for feeding electrical energy to the electrical energy storage means for recharging the latter, for instance.

Coupling the emergency supply energy storage device to the electrical unit allows to feed the electrical unit of the safety-relevant system with electrical energy in case a line to the main supply storage device and/or the main supply energy storage device breaks down.

Due to coupling the signal line to the emergency supply energy storage device, it is possible to feed the emergency supply energy storage device with electrical energy via the signal line, for instance to recharge the electrical energy storage means of the emergency supply energy storage device. This allows to recharge the emergency supply energy storage device even in case the main supply energy storage device and/or a connection to the main supply energy storage device breaks down. Thus, a very reliable use of the electrical unit in combination with the emergency supply energy storage device of the safety-relevant system is made possible. In addition, an ageing process can be compensated for, for example by recharging the emergency supply energy storage device by means of the signal line. In addition, a process of discharging the electrical energy storage means of the emergency supply energy storage device may possibly be prevented and/or slowed down due to the fact that coupling and recharging are effected by the signal line so that a reliable electrical emergency supply of the electrical unit of the safety-relevant system can be made possible by means of the emergency supply energy storage device.

Furthermore, coupling the signal line to the emergency supply energy storage device realizes an emergency supply system so that a second positive and/or negative main supply connection may be dispensed with, for instance.

As an alternative or in addition, it is also possible that two or more signal lines are coupled to the emergency supply energy storage device for feeding electrical energy to the emergency supply energy storage device.

According to a second aspect, the invention is distinguished by a safety-relevant system in a vehicle, comprising an electrical unit with at least one signal line input which is connected to a signal line. The electrical unit further comprises a supply connection for feeding the electrical unit with electrical energy. The safety-relevant system further comprises an emergency supply energy storage device comprising an energy storage connection which is electrically connected to the supply connection of the electrical unit for supplying electrical energy to the electrical unit. In addition, the emergency supply energy storage device is electrically coupled to the signal line for supplying electrical energy to the emergency supply energy storage device.

Due to the fact that the emergency supply energy storage device is coupled to the electrical unit, it is possible to feed the electrical unit of the safety-relevant system with electrical energy in case e.g. a line to the main supply storage device and/or the main supply energy storage device breaks down.

Coupling the signal line to the emergency supply energy storage device allows to feed the emergency supply energy storage device with electrical energy via the signal line. This allows to recharge the emergency supply energy storage device even in case the main supply energy storage device and/or a connection to the main supply energy storage device breaks down, for example. Thus, a very reliable use of the electrical unit in combination with the emergency supply energy storage device of the safety-relevant system is made possible. In addition, an ageing process can be compensated for, for example by recharging the emergency supply energy storage device by means of the signal line. In addition, a process of discharging the electrical energy storage means of the emergency supply energy storage device may possibly be prevented and/or slowed down due to the fact that coupling and recharging are effected by the signal line so that a reliable electrical emergency supply of the electrical unit of the safety-relevant system can be made possible by means of the emergency supply energy storage device.

Furthermore, coupling the signal line to the emergency supply energy storage device realizes an emergency supply system so that a second positive and/or negative main supply connection may be dispensed with, for instance.

As an alternative or in addition, it is also possible that two or more signal lines are coupled to the emergency supply energy storage device for supplying electrical energy to the emergency supply energy storage device.

According to a further advantageous configuration, the emergency supply energy storage device comprises a super capacitor.

Super capacitors are compact and powerful energy storage devices which can be charged very fast and very effectively via the signal line in case of need. Such a super capacitor has a capacity in the one-digit Farad range, for instance. The super capacitor is distinguished, for instance, in that it combines two accumulating principles such as a static scheme of accumulating electrical energy in Helmholtz double layers and an electrochemical scheme of accumulating electrical energy by way of a faradaiac charge transfer achieved by redox reactions on the surface areas of the electrodes of the super capacitors.

According to a further advantageous configuration, the electrical unit comprises an electrical actuator.

Electric actuators such as e.g. coils and/or electrical machines comprise signal lines such as e.g. motor power lines which can be readily coupled to the emergency supply energy storage device to supply the latter with electrical energy in order to recharge the electrical energy storage means of the emergency supply energy storage device, for example.

According to a further advantageous configuration, the electrical actuator is a DC motor.

DC motors have several signal lines such as e.g. at least two motor power lines which can be easily coupled to the emergency supply energy storage device to supply the latter with electrical energy in order to recharge the electrical energy storage means of the emergency supply energy storage device, for example.

According to a further advantageous configuration, the signal line is a motor power line.

To give an example, the motor power line couples or connects the output of an output stage directly to an electrical machine such as e.g. a DC motor and/or a stepper motor and/or a three-phase current motor.

To give an example, at least two signal lines which are coupled to the electrical machine and/or to the emergency supply energy storage device for supplying with electrical energy, are motor power lines.

Motor power lines can be coupled to the emergency supply energy storage device in a simple manner for supplying the latter with electrical energy or for recharging the electrical energy storage means of the emergency supply energy storage device. Moreover, motor power lines are particularly suitable for transmitting electrical currents.

According to a further advantageous configuration, the signal line is provided for transmitting data.

Many safety-relevant systems have at least one signal line which is provided for transmitting data. For that reason, it is advantageous to use this signal line for feeding the emergency supply energy storage device with electrical energy or for recharging the electrical energy storage means of the emergency supply energy storage device. In this way, it is also possible to feed emergency supply energy storage devices (associated to safety-relevant systems which do not have any electrical machine) with electrical energy via a signal line which is provided for data transmission, or they can be recharged via the signal line.

According to a further advantageous configuration, the electrical unit comprises a sensor.

Sensors need a very small amount of electrical energy, if need be. Thus, the respective sensor can be supplied with electrical energy by means of the emergency supply energy storage device in a particularly reliable manner and, if need be, for a particularly long period of time if the emergency supply energy storage device is electrically coupled to a signal line of the electrical unit.

According to a further advantageous configuration, the safety-relevant system is an electrical door lock system of the vehicle.

The electrical door lock system is e.g. a so-called ABW lock (Access-By-Wire lock). In a door lock system of this type, the door comprises, for instance, an electrical switch such as an electrical sensor which detects whether the door is to be unlocked. If the door is to be unlocked, an actuator such as e.g. a DC motor and/or a stepper motor and/or a three-phase current motor is triggered and unlocks the vehicle door. As it may happen that a mechanical unlocking process is not possible with such a system, it is particularly important that the actuator is supplied in a particularly reliable manner with at least such an amount of electrical energy that it is capable of unlocking the door at least once. This supply can be made possible in a very reliable manner, for example, by the coupling to the signal line.

Exemplary embodiments of the invention will be explained below on the basis of the schematic drawing in which:

FIG. 1 shows a safety-relevant system in a vehicle.

FIG. 1 shows a safety-relevant system S in a vehicle. The safety-relevant system S is an electrical door lock system, for instance, such as e.g. a so-called ABW lock (Access-By-Wire lock). With a door lock system of this type, the door comprises an electrical switch, for example, such as an electrical sensor detecting whether the door is to be unlocked. If there is the need to unlock the door, an actuator such as e.g. a DC motor and/or a stepper motor and/or a three-phase current motor is triggered and unlocks the vehicle door.

As an alternative or in addition, the safety-relevant system S, for instance, is an air bag system and/or a belt tensioner and/or any other safety-relevant system in the vehicle.

The safety-relevant system S comprises an electrical unit EE. The electrical unit EE includes, for instance, an actuator such as an electrical machine such as a DC motor and/or a stepper motor and/or a three-phase current motor, for instance. The actuator acts, for instance, on a door lock system of the vehicle or on an airbag triggering system or a belt tensioner unit. As an alternative or in addition, the electrical unit EE comprises one or more sensors.

The electrical unit EE comprises at least one supply connection VA for feeding the electrical unit EE with electrical energy. The supply connection VA can be electrically coupled to a main supply energy storage device BAT by means of a supply line VL, for instance, and/or is electrically connected to the main supply energy storage device BAT.

The main supply energy storage device BAT is an accumulator, for instance, such as a lead-type accumulator. As an alternative or in addition, the supply connection VA can be coupled to a generator or is connected to a generator, for instance, which produces electrical energy for feeding the electrical unit EE with electrical energy.

The supply line VL is protected, for example, by means of an electrical fuse F1 such as a melt-type fuse, for instance, which can be exclusively used for the safety-relevant system S. The supply line VL, for example, can be exclusively used for the safety-relevant system S.

The electrical unit EE of the safety-relevant system S comprises at least one signal line input SE which is connected to a signal line. In addition, the signal line is electrically coupled to the supply connection VA of the electrical unit EE or to a further supply connection VA of the electrical unit EE for supplying electrical energy to the electrical unit EE.

As an alternative or in addition, it is also possible that two signal lines are connected to two supply connections VA of the electrical unit EE; by way of example, one signal line may be provided for a positive electrical power supply and one signal line for a negative electrical power supply.

The signal line is a motor power line SL and/or a data line DL, for instance, which is intended to transmit data. In case the electrical unit EE comprises an electrical actuator, for instance, such as an electrical machine such as a DC motor and/or a stepper motor and/or a three-phase current motor, it comprises at least two motor power lines SL, for instance. As an alternative or in addition, the electrical unit EE may also comprise two or more electrical actuators and more than two motor power lines SL.

The motor power line SL couples or connects, for example, the output of an output stage directly to the electrical unit EE or to the electrical machine of the electrical unit EE. The motor power line SL is able to transmit currents in the Ampere range, for instance at a voltage level of 12 V, for instance with a frequency in the one-digit Hertz range.

The data line DL is provided, for example, for a data bus such as e.g. a LIN bus via which e.g. control commands can be sent to the electrical unit EE. The data line DL is able to transmit currents in the milliampere range and/or microampere range, for instance at a voltage level of 12 V, for instance with a frequency in the one-digit to two-digit kilohertz range.

The safety-relevant system S additionally comprises an emergency supply energy storage device ES, for instance. The emergency supply energy storage device ES comprises an electrical energy storage means such as a super capacitor. A super capacitor of this type has a capacity in the one-digit or two-digit Farad range. As an alternative, the emergency supply energy storage device ES may also comprise, for instance, two super capacitors which are connected in series, for example. The super capacitor is distinguished, for instance, in that it combines two accumulating principles such as a static scheme of accumulating electrical energy in Helmholtz double layers and an electrochemical scheme of accumulating electrical energy by way of a faradaiac charge transfer achieved by redox reactions on the surface areas of the electrodes of the super capacitors.

The emergency supply energy storage device ES comprises an energy storage connection ESA, for example, which is electrically connected to a supply connection VA of the electrical unit EE, for instance to the supply connection VA of the electrical unit EE, which can be electrically coupled to the main supply energy storage device BAT. In this way, the electrical unit EE of the emergency supply energy storage device ES can be supplied with energy.

As an alternative or in addition, it is also possible to connect two energy storage connections ESA of the emergency supply energy storage device ES to two supply connections VA of the electrical unit EE; in this way, a respective positive and negative supply connection VA of the electrical unit EE may be connected to a positive or negative energy storage connection ESA of the emergency supply energy storage device ES. In addition and as an example, the energy storage connection ESA of the emergency supply energy storage device ES or a further energy storage connection ESA of the emergency supply energy storage device ES can be coupled to the main supply energy storage device BAT for recharging the emergency supply energy storage device ES.

In addition and as an example, the signal line which is connected to the signal line input SE of the electrical unit EE, is coupled to the emergency supply energy storage device ES for supplying electrical energy to the emergency supply energy storage device ES, for instance for recharging the electrical energy storage means of the emergency supply energy storage device ES. To this end, the signal line is coupled to the energy storage connection ESA of the emergency supply energy storage device ES, for instance, which is connected to the supply connection VA of the electrical unit EE and/or to a further energy storage connection ESA of the emergency supply energy storage device ES.

As an alternative or in addition, it is also possible that two signal lines are connected to two energy storage device connections ESA of the emergency supply energy storage device ES; by way of example, one signal line may be provided for a positive electrical supply and one signal line for a negative electrical supply.

As an alternative or in addition, it is also possible that several signal lines connected to the electrical unit EE are coupled to the emergency supply energy storage device ES, such as e.g. several motor power lines SL and/or several data lines DL. If, for instance, at least one of the motor power lines SL is coupled to the emergency supply energy storage device ES, the electrical energy storage means of the emergency supply energy storage device ES can be fed with electrical energy e.g. by means of motor power signals which are sent to the electrical unit EE by means of the motor power line SL, for instance in order to be recharged; in this process, currents in the milliamp range are sufficient for the electrical recharging process, where necessary.

If, for instance, at least one of the data lines DL is coupled to the emergency supply energy storage device ES, the electrical energy storage means can be fed with electrical energy by means of data such as e.g. control commands which are sent to the electrical unit EE by means of the data line DL, for instance in order to be recharged; in this process, currents in the milliamp range are sufficient for the electrical recharging process, if necessary.

By way of example, the emergency supply energy storage device ES is electrically coupled to the respective signal line by means of a diode D1, D2. Depending on the location of the diode D1, the respective motor power line SL may be used for a positive or a negative voltage supply of the actuator. In addition, the emergency supply energy storage device ES can be coupled to the signal line through a diode D3, with the diodes D2 and D3 being antiparallel. Most of all, this is advantageous with a data line DL, as the signals transmitted on the data line DL act like an alternating voltage. Instead of diodes as the coupling elements, any other coupling element may be used, too, which serves the purpose to supply the emergency supply energy storage device ES with electrical energy via the signal line, or that the electrical energy storage means of the emergency supply energy storage device ES can be recharged via the signal line.

The capacity of the electrical energy storage means of the emergency supply energy storage device ES is of such size, for instance, that the electrical unit EE can be operated by the emergency supply energy storage device ES at least for one working cycle, in particular in case the emergency supply energy storage device ES is coupled to only a single data line DL, for example. In this context, a working cycle is a cycle during which a safety-relevant action (for which the electrical unit EE is provided) is carried out by the electrical unit EE. By way of example, such a working cycle is a door unlocking cycle beginning at a locked vehicle door and ending with an unlocked vehicle door.

The signal line(s) can be electrically coupled to a control unit STE or are electrically connected to it. The control unit STE is designed for triggering the electrical unit EE of the safety-relevant system S, hence for sending control commands via the data line DL and/or for controlling a motor trigger unit via the motor power lines SL, for instance. The control unit STE is a Body-Domain-Controller (BDC), for example.

The control unit STE is electrically connected to the main supply energy storage device BAT and/or to a further main supply energy storage device, for instance via a further supply line VL. The supply line VL of the control unit STE is protected by means of an electrical fuse F2, for example, such as e.g. a melt-type fuse which may be exclusively used for the control unit STE, for instance.

In case of a malfunction between the main supply energy storage device BAT and the safety-relevant system S, the emergency supply energy storage device ES and/or the electrical unit EE may be fed with electrical energy by means of the signal line and/or by means of the signal lines of the control unit STE. Malfunctions of this type are, for instance, a breakdown of the supply line VL of the electrical unit EE, if the supply connection VA, of the electrical unit EE, which is electrically coupled to the main supply energy storage device BAT, is not electrically connected to the energy storage connection ESA of the emergency supply energy storage device ES. If the supply connection VA is electrically coupled both to the main supply energy storage device BAT and to the energy storage connection ESA of the emergency supply energy storage device ES, such a malfunction is e.g. a malfunction of the supply line VL of the electrical unit EE between the main supply energy storage device BAT and a crosspoint KP where the supply line VL of the electrical unit EE meets the line extending from the energy storage connection ESA of the emergency supply energy storage device ES to the supply connection VA of the electrical unit EE. Here, it is not required that the malfunction is detected, because the control unit STE is possibly not especially arranged for supplying the emergency supply energy storage device ES and/or the electrical unit EE with electrical energy, but is arranged for controlling the electrical unit EE, for example.

As the motor power lines SL transmit currents in the Ampere range with a frequency in the one-digit Hertz range, motor power lines SL are suitable for simultaneously feeding electrical energy to the electrical unit EE as well as to the emergency supply energy storage device ES.

As the data line DL transmits currents in the milliampere range and/or microampere range with a frequency from the one-digit to the two-digit kilohertz range, the data line is particularly suited for supplying the emergency supply energy storage device ES with electrical energy, for instance in order to slowly charge it.

As an alternative or in addition to the exemplary embodiment shown in FIG. 1, in which the supply connection VA, associated to the electrical unit EE and coupled to the energy storage connection ESA of the emergency supply energy storage device ES, represents a positive supply connection, coupling a negative supply connection of the electrical unit EE may also be realized.

As an alternative or in addition to the exemplary embodiment shown in FIG. 1, in which the supply connection VA, associated to the electrical unit EE and coupled to the signal line, represents a positive supply connection, a connection of a negative supply connection of the electrical unit EE may also be realized.

As an alternative or in addition to the exemplary embodiment which is shown in FIG. 1 and in which the energy storage connection ESA of the emergency supply energy storage device ES, which is coupled to the signal line by means of the diode D1, represents a positive energy storage connection, it is also possible to realize a connection of a negative energy storage connection of the emergency supply energy storage device ES.

LIST OF REFERENCE NUMERALS

BAT main supply energy storage device
D1, D2, D3 diodes
DL data line
EE electrical unit
ES emergency supply energy storage device
ESA energy storage connection
F1, F2 electrical fuses
KP crosspoint
S system
STE control unit
SE signal line input
SL motor power line
VA supply connection
VL supply line

The invention claimed is:

1. A safety-relevant system (S) in a vehicle, comprising
an electrical unit (EE) comprising at least one signal line input (SE) which is connected to a signal line, the electrical unit (EE) further comprising a supply connection (VA) for feeding the electrical unit (EE) with electrical energy, the signal line further being electrically coupled to the supply connection (VA) of the electrical unit (EE) for supplying electrical energy to the electrical unit (EE), wherein the supply connection (VA) comprises a positive supply connection and a negative supply connection, and
an emergency supply energy storage device (ES) comprising an energy storage connection (ESA) which is electrically coupled to the positive supply connection or to the negative supply connection for supplying electrical energy to the electrical unit (EE), the emergency supply energy storage device (ES) further being electrically coupled to the signal line for supplying electrical energy to the emergency supply energy storage device (ES).

2. The safety-relevant system (S) according to claim 1, wherein the emergency supply energy storage device (ES) comprises a super capacitor.

3. The safety-relevant system (S) according to claim 1, wherein the electrical unit (EE) comprises an electrical actuator.

4. The safety-relevant system (S) according to claim 3, wherein the electrical actuator is a DC motor.

5. The safety-relevant system (S) according to claim 3, wherein the signal line is a motor power line.

6. The safety-relevant system (S) according to claim 5, wherein the signal line is provided for transmitting data.

7. The safety-relevant system (S) according to claim 6, wherein the electrical unit (EE) comprises a sensor.

8. The safety-relevant system (S) according to claim 1, wherein the signal line is provided for transmitting data.

9. The safety-relevant system (S) according to claim 8, wherein the electrical unit (EE) comprises a sensor.

10. The safety-relevant system (S) according to claim 1, wherein the safety-relevant system (S) is an electrical door lock system of the vehicle.

11. The safety-relevant system (S) in a vehicle, comprising an electrical unit (EE) comprising at least one signal line input (SE) which is connected to a signal line, the electrical unit (EE) further comprising a supply connection (VA) for feeding the electrical unit (EE) with electrical energy, an emergency supply energy storage device (ES) comprising an energy storage connection (ESA) which is electrically coupled to the supply connection (VA) of the electrical unit (EE) for supplying electrical energy to the electrical unit (EE), the emergency supply energy storage device (ES) further being electrically coupled to the signal line for supplying electrical energy to the emergency supply energy storage device (ES).

12. The safety-relevant system (S) according to claim 11, wherein the emergency supply energy storage device (ES) comprises a super capacitor.

13. The safety-relevant system (S) according to claim 11, wherein the electrical unit (EE) comprises an electrical actuator.

14. The safety-relevant system (S) according to claim 13, wherein the electrical actuator is a DC motor.

15. The safety-relevant system (S) according to claim 13, wherein the signal line is a motor power line.

16. The safety-relevant system (S) according to claim 15, wherein the signal line is provided for transmitting data.

17. The safety-relevant system (S) according to claim 16, wherein the electrical unit (EE) comprises a sensor.

18. The safety-relevant system (S) according to claim 11, wherein the safety-relevant system (S) is an electrical door lock system of the vehicle.

19. The safety-relevant system (S) according to claim 11, wherein the signal line is provided for transmitting data.

20. The safety-relevant system (S) according to claim 19, wherein the electrical unit (EE) comprises a sensor.

* * * * *